US012071790B2

(12) United States Patent
Chapuis et al.

(10) Patent No.: US 12,071,790 B2
(45) Date of Patent: Aug. 27, 2024

(54) APPARATUSES THAT SECURE LAPTOPS TO DISPLAY SURFACES

(71) Applicant: OnQ Solutions, Inc., Hayward, CA (US)

(72) Inventors: Paul F. Chapuis, Woodside, CA (US); Steven D. Penny, Oakland, CA (US); Sean A. Naderzad, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 295 days.

(21) Appl. No.: 17/342,931

(22) Filed: Jun. 9, 2021

(65) Prior Publication Data

US 2022/0396976 A1 Dec. 15, 2022

(51) Int. Cl.
*E05B 73/00* (2006.01)

(52) U.S. Cl.
CPC ................................ *E05B 73/0082* (2013.01)

(58) Field of Classification Search
CPC ... E05B 73/00; E05B 73/0005; E05B 73/0082
See application file for complete search history.

(56) References Cited

U.S. PATENT DOCUMENTS 5,836,183 A * 11/1998 Derman .............. E05B 73/0082 70/164
6,443,417 B2 * 9/2002 Galant ................ E05B 73/0082 248/553
7,007,912 B1 * 3/2006 Giuliani .............. E05B 73/0082 248/552
7,174,752 B2 * 2/2007 Galant ................ E05B 73/0082 248/553
D559,076 S 1/2008 Allen
7,324,333 B2 * 1/2008 Allen .................. E05B 73/0082 361/679.55
7,370,840 B1 5/2008 Deconinck
7,866,623 B2 1/2011 Lampman et al.
8,061,164 B2 * 11/2011 Johnston ............. E05B 73/0082 70/211
8,646,294 B1 2/2014 Derman
8,837,144 B1 * 9/2014 Allen .................. E05B 73/0082 211/8
8,882,069 B2 * 11/2014 Mahaffey ............ E05B 73/0082 70/164
9,996,710 B2 6/2018 Leyden
10,273,722 B2 * 4/2019 Leyden ............... E05B 73/0082
10,791,638 B2 * 9/2020 Wu ...................... H05K 5/0221
10,907,383 B2 * 2/2021 Klinkman ........... E05B 73/0082
11,313,154 B2 * 4/2022 Weng .................. E05B 73/0082
(Continued)

*Primary Examiner* — Christopher J Boswell
(74) *Attorney, Agent, or Firm* — Vierra Magen Marcus LLP

(57) ABSTRACT

A security apparatus secures a laptop or other secured object to a display surface. The security apparatus includes a pair of spaced apart slats for receiving a display of the laptop, or other upwardly extending portion of a secured object. The slats are mounted at each of their ends to a restraint assembly. The restrain assemblies mount to the display surface with one of the slats positioned above the laptop keyboard, or other horizontally extending portion of the secured object. When the security apparatus is attached to the display surface, all fasteners to secure the security apparatus to the display surface are inaccessible from above the display surface.

21 Claims, 8 Drawing Sheets

(56) References Cited

U.S. PATENT DOCUMENTS

| | | | | |
|---|---|---|---|---|
| 2007/0290115 | A1 | 12/2007 | Meyer | |
| 2011/0100073 | A1 | 5/2011 | Johnston et al. | |
| 2016/0340936 | A1 | 11/2016 | Burt | |
| 2017/0124357 | A1 * | 5/2017 | Leyden | E05B 73/0082 |

* cited by examiner

APPARATUSES THAT SECURE LAPTOPS TO DISPLAY SURFACES

FIELD OF TECHNOLOGY

Embodiments of the present technology relate to apparatuses that secure laptops to display surfaces.

BACKGROUND

Laptops are generally displayed in retail stores on display tables in such a way that allows users to inspect and evaluate the laptop, both with respect to its physical look and feel, as well as its operation. Since laptops are costly, it would be preferable if they could be secured to the display surface to prevent theft. While there are currently some security apparatuses available to securely display laptops in retail stores, it would be beneficial to provide an improved laptop security apparatus.

SUMMARY

A security apparatus of the present technology is adapted to selectively secure a laptop or other secured object to a tabletop of a display table or other display surface. In accordance with certain embodiments, the security apparatus comprises a pair of spaced apart slats for receiving a display of the laptop, or other upwardly extending portion of a secured object. The slats are mounted at each of their ends to a restraint assembly. The restrain assemblies mount to the display surface with one of the slats positioned above the laptop keyboard, or other horizontally extending portion of the secured object. When the security apparatus is attached to the display surface, all fasteners to secure the security apparatus to the display surface are inaccessible from above the display surface.

In accordance with certain embodiments, the security apparatus comprises: first and second slats each having first and second ends, the first and second slats spaced apart from each other and configured to receive an upwardly extending portion of the secured object in a space between the first and second slats; and first and second restraint assemblies each configured to mount to the surface on which the secured object is displayed with the first restraint assembly positioned on a first side of the secured object and the second restraint assembly positioned on a second side of the secured object opposed to the first side, the first end of the first slat affixed to the first restraint assembly, the second end of the first slat affixed to the second restraint assembly, the first end of the second slat affixed to the first restraint assembly, and the second end of the second slat affixed to the second restraint assembly.

In accordance with certain embodiments, the first and second slats comprise slots, the security apparatus further comprising a girder positioned in each slot, the girders configured to strengthen the first and second slats.

In accordance with certain embodiments, the first and second slats are transparent.

In accordance with certain embodiments, the security apparatus further comprises at least first and second threaded rods extending from bottom portions of the first and second restraint assemblies, the first and second threaded rods configured to affix the first and second restraint assemblies to the surface on which the secured object is displayed.

In accordance with certain embodiments, the fasteners are affixed to the threaded rods from an underside of the surface on which the secured object is displayed, the underside residing in a secured enclosure.

In accordance with certain embodiments, the first and second restraint assemblies are configured to support one of the first and second slats above a horizontally extending portion of the secured object to enable use and inspection of the horizontally extending portion of the secured object.

In accordance with certain embodiments, the first and second ends of the first and second slats are secured by screws to portions of the first and second restraint assemblies.

In accordance with certain embodiments, the restraint assemblies comprising secure housings, the screws are positioned within the housing and accessible only from a portion of the restraint assemblies configured to mount to the surface on which the secured object is displayed.

In accordance with certain embodiments, the secured object is a laptop.

In accordance with certain embodiments, the security apparatus comprises: first and second slats spaced apart from each other and configured to receive an upwardly extending portion of the secured object in a space between the first and second slats; and first and second restraint assemblies each having a bottom surface configured to mount to the display surface for displaying the secured object with the first restraint assembly positioned on a first side of the secured object and the second restraint assembly positioned on a second side of the secured object opposed to the first side, each of the first and second restraint assemblies comprising: screws affixing the first and second slats to the first and second restraint assemblies; an inner plate, and an outer plate; wherein the inner plate and the outer plate together define a pair of channels for receiving the pair of slats; and wherein the inner plate and outer plate together define an enclosure for preventing access to the screws affixing the first and second slats to the first and second restraint assemblies when said each restraint assembly is affixed to the display surface.

In accordance with certain embodiments, each restraint assembly further comprising a mounting plate mounted between the inner plate and the outer plate, the mounting plate comprising screw holes for receiving the screws to affix first and second slats to the first and second restraint assemblies.

In accordance with certain embodiments, each restraint assembly further comprising an inner cap mounted between the mounting plate and a flange of the outer plate.

In accordance with certain embodiments, the inner cap defining the space between the first and second slats.

In accordance with certain embodiments, each restraint assembly further comprising a screw plate mounted at the bottom surface, the screw plate configured to receive at least one threaded rod for affixing said each restraint assembly to the display surface.

In accordance with certain embodiments, the threaded rod is welded to the screw plate.

In accordance with certain embodiments, the threaded rod is screwed into a threaded hold of the screw plate.

In accordance with certain embodiments, each of the first and second slats comprising first and second ends, wherein the first end of the first slat affixed to the first restraint assembly, the second end of the first slat affixed to the second restraint assembly, the first end of the second slat affixed to the first restraint assembly, and the second end of the second slat affixed to the second restraint assembly.

In accordance with certain embodiments, the security apparatus comprises: first and second slats spaced apart from each other and configured to receive display of the laptop in a space between the first and second slats, each of the first and second slats comprising a slot; a girder mounted in each of the slots of the first and second slats; and first and second restraint assemblies each configured to mount to the display surface, the first and second slats mounted within channels in the first and second restraint assemblies.

In accordance with certain embodiments, the first and second slats are configured with a spacing allowing tilting of the display to different angles while positioned between the first and second slats.

In accordance with certain embodiments, the first and second restraint assemblies are configured to position the first and second slats above a keyboard of the laptop with a spacing between the first and second slats and the keyboard.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1:
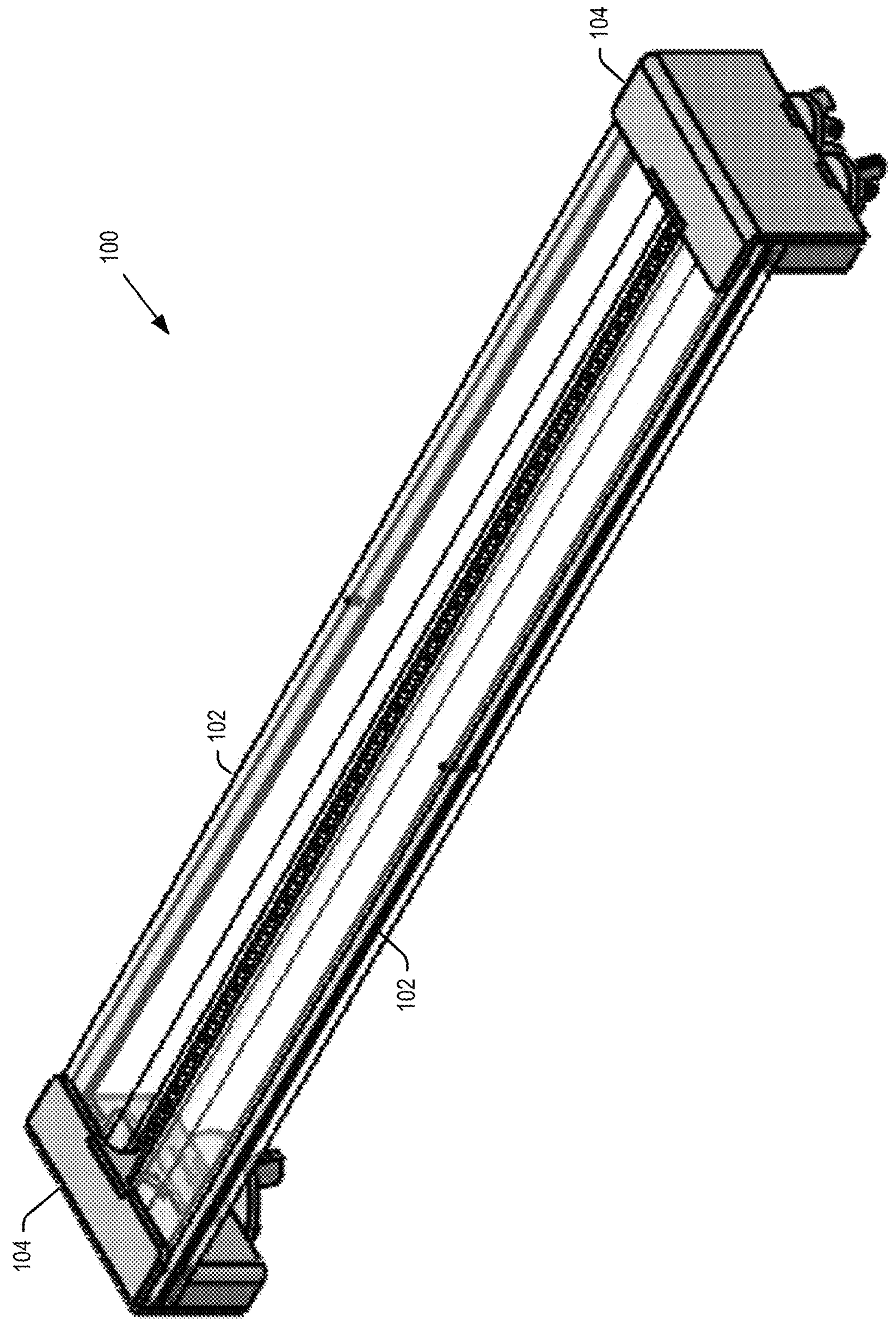
FIG. 1 is top perspective view of a security apparatus according to an embodiment of the present technology.
Figure 2:
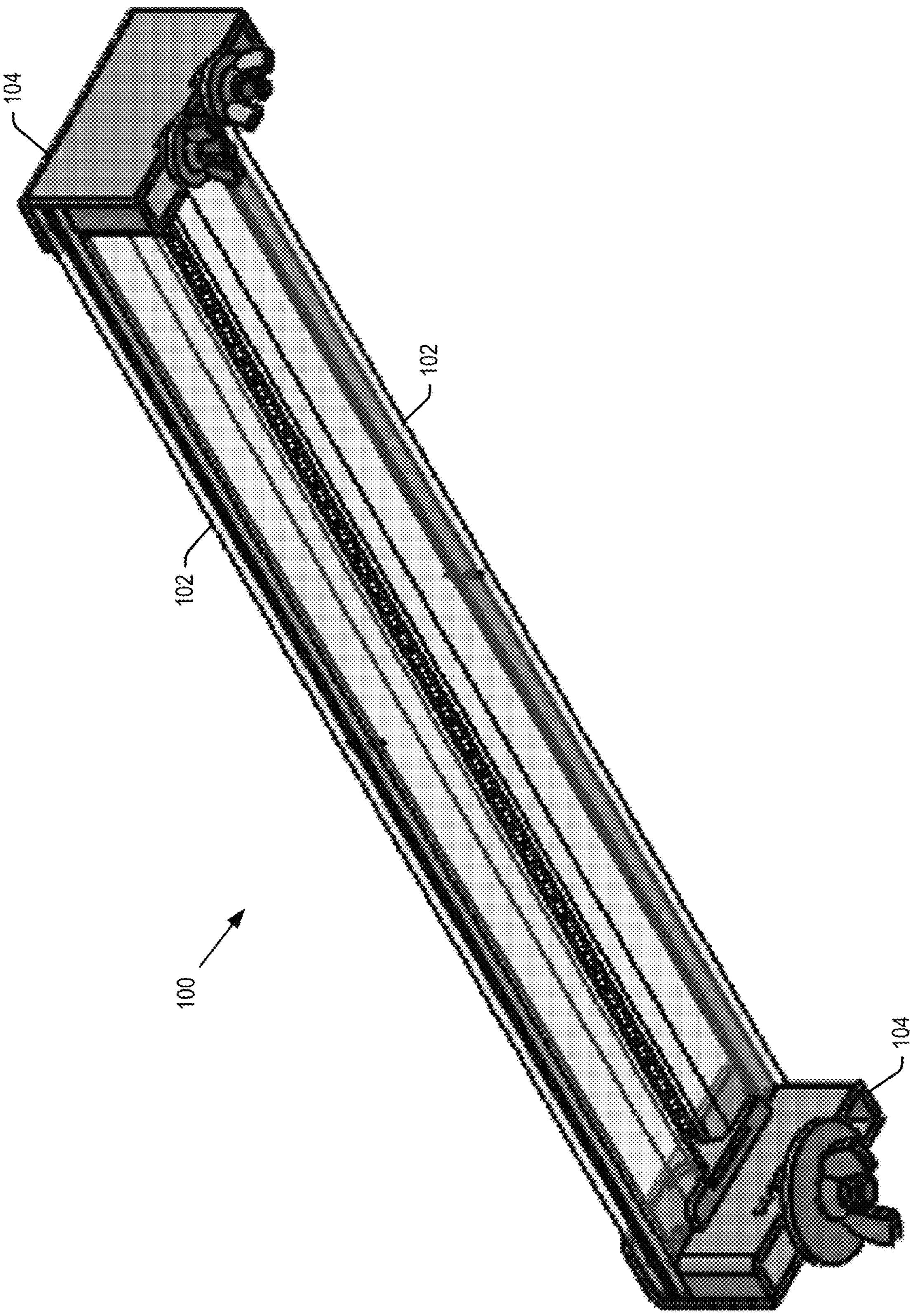
FIG. 2 is a bottom perspective view of the security apparatus according to an embodiment of the present technology.

FIGS. 1 and 2 are top and bottom perspective views of a security apparatus 100 according to an embodiment of the present technology. The security apparatus 100 is used to secure a laptop to a tabletop for display. It is conceivable that the apparatus 100 be used to secure objects other than a laptop, and in general the object secured by the apparatus 100 may be referred to herein as a "secured object."

Figure 5:
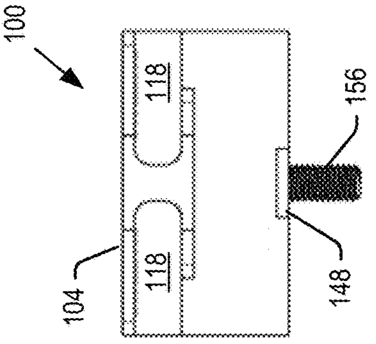
FIG. 5 is a cross-sectional end view of the security apparatus according to an embodiment of the present technology.
Figure 3:
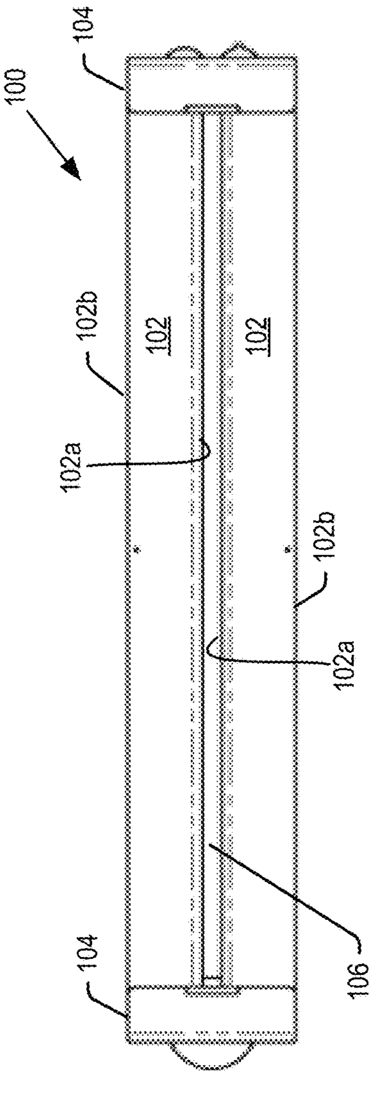
FIG. 3 is a top view of the security apparatus according to an embodiment of the present technology.
Figure 4:
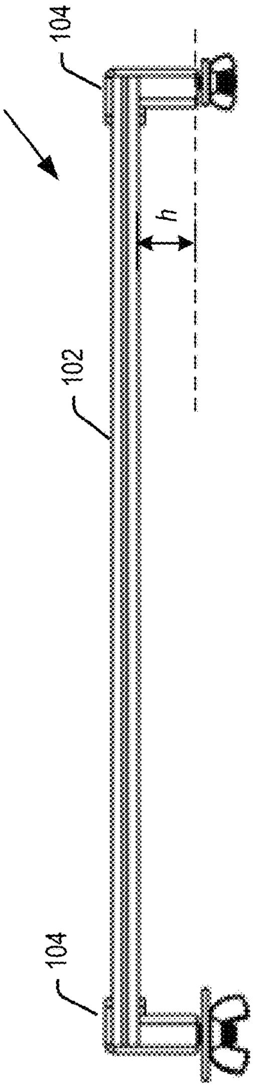
FIG. 4 is a front view of the security apparatus according to an embodiment of the present technology.

As shown in the top and bottom perspective views of FIGS. 1 and 2, as well as the top, front and cross-sectional end views of FIGS. 3-5, the security apparatus 100 in general includes a pair of spaced apart slats 102, secured at their respective ends by a pair of restraint assemblies 104. Laptops in general include a base with a keyboard and a display configured to rotate with respect to the base. The security apparatus 100 fits onto the laptop with the display positioned within a space 106 (FIG. 3) between the slats 102. In one example, the spacing 106 may be 0.375", though the space 106 may be larger or smaller than that in further embodiments. It is noted that the terms space 106 and spacing 106 are used interchangeably herein. Once the display is positioned between the slats 102, the restraint assemblies 104 may then be secured to a tabletop or other display surface as explained below. As is also explained below, the space 106 and the height (h, FIGS. 4 and 11) at which the restraint assemblies support the slats 102 is provided so that the security apparatus is minimally invasive when a user is inspecting/evaluating a laptop, while at the same time preventing removal of the laptop from its display surface.

Figure 6:
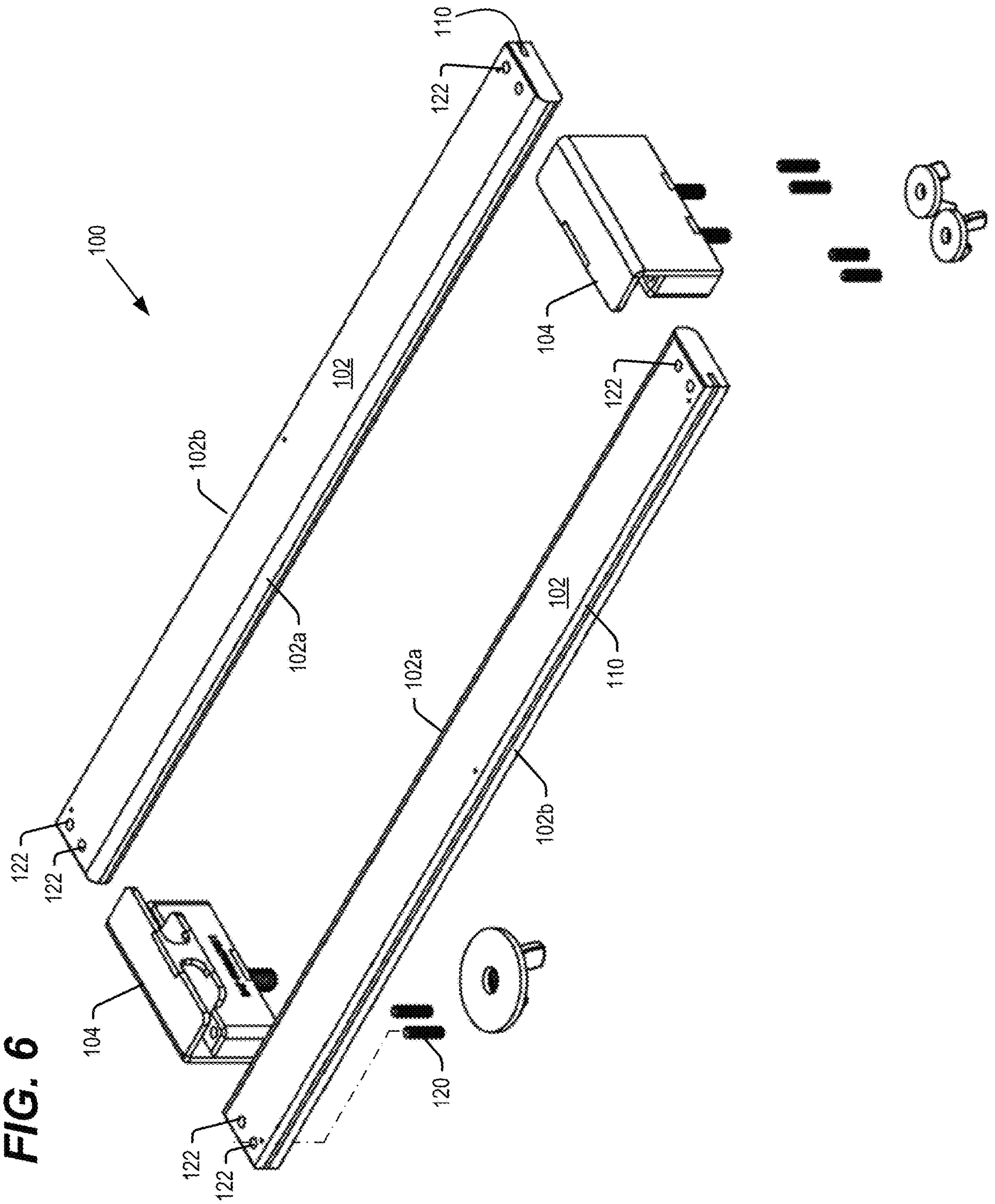
FIG. 6 is an exploded perspective view of the security apparatus according to an embodiment of the present technology.
Figure 7:
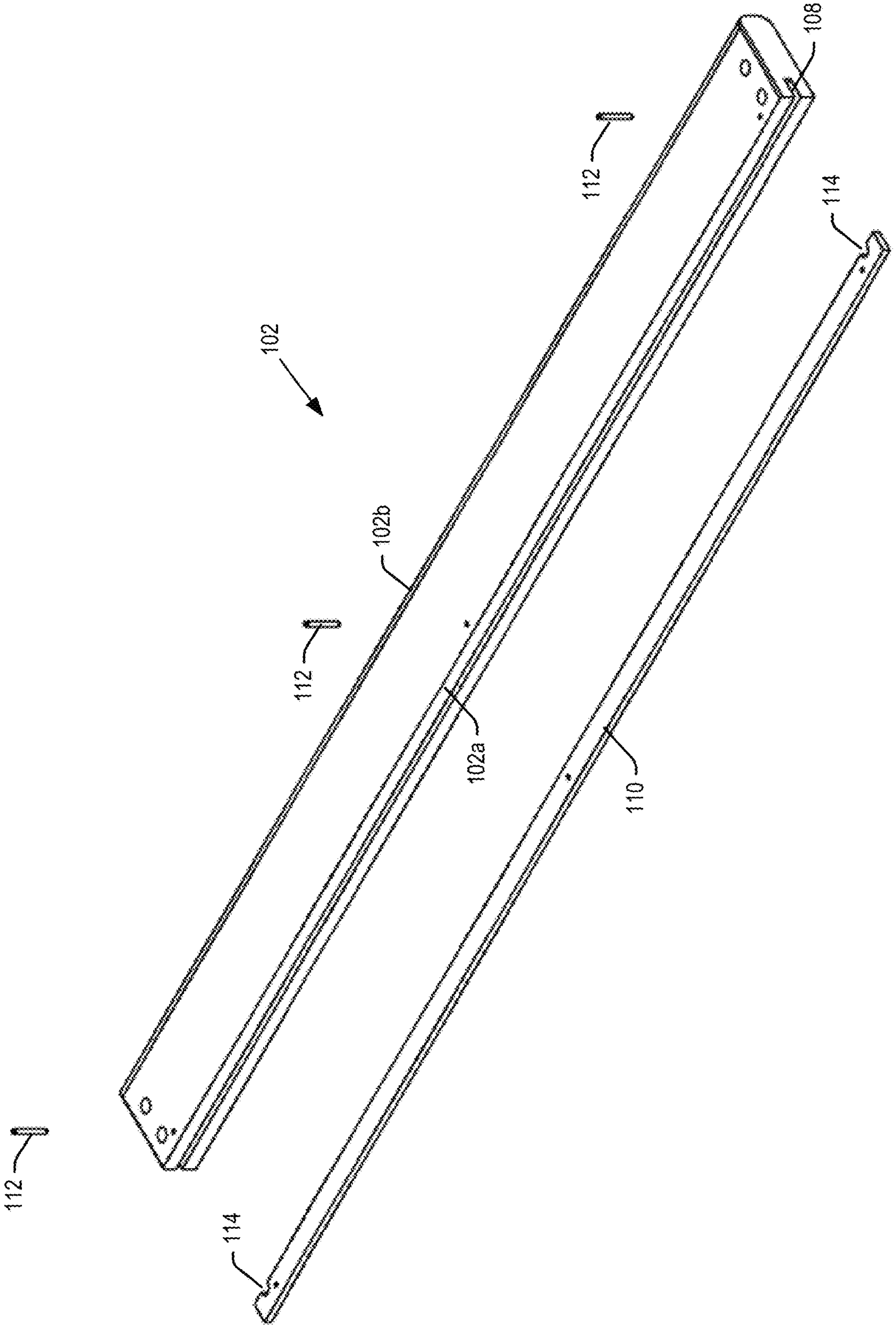
FIG. 7 is an exploded perspective view of a slat and girder according to an embodiment of the present technology.

Slats 102 will now be explained with reference to FIGS. 1-5, as well as the exploded perspective views of FIGS. 6 and 7. Each slat 102 may for example be 16.6" long, 1.4" wide and 0.5" thick. Each of these dimensions may vary in further embodiments, proportionately or disproportionately to each other. In examples, the slats 102 may be provided in different lengths for use in different security apparatuses 100 that are customized to operate with laptops or other secured objects of different lengths. In embodiments, the slats 102 may be formed of a transparent but high strength material such as polycarbonate, though other polymers such as ABS may be used. Forming the slats of a transparent material reduces any interference security apparatus 100 may have in the user experience when inspecting/evaluating a secured laptop. However, in further embodiments, slats 102 may be formed of an opaque material, including for example stainless steel.

Each slat 102 may be identical to each other, and include first edges 102*a* positioned adjacent each other across space 106 when the slats 102 are fastened into the security apparatus 100. Edges 102*a* may be rounded, or have rounded top and bottom corners, to better allow the laptop display to be rotated while positioned between slats 102, and also to prevent sharp edges from contacting the laptop display. In one example, the top and bottom corners of edges 102*a* may be radiused at 0.19", but the radii of the top and bottom corners of edges 102*a* may be larger or smaller than that in further embodiments. As noted, in one further example, the edge may be rounded with a radius of 0.25", making for a completely rounded edge where a slat 102 has a thickness of 0.5".

Each slat 102 may include edges 102*b* opposite edges 102*a*. Edges 102*b* may be formed with a slot 108 to receive a girder 110 which may be pinned into slot 108 using pins 112. Girder 110 may be a thin piece of stainless steel for example 0.094" thick and 0.313" wide, and running the entire length of a slat 102. Girders 110 may have other thicknesses and widths in further embodiments. Girders 110 may be provided in edges 102*b* of slats 102 to increase the strength of slats 102, for example making it more difficult to saw or cut through slats 102 from edges 102*b*. Girders 110 may be provided with notches 114 so as not to interfere with set screws 120 used to affix slats 102 to the restraint assemblies 104 as will now be explained.

Figure 9:
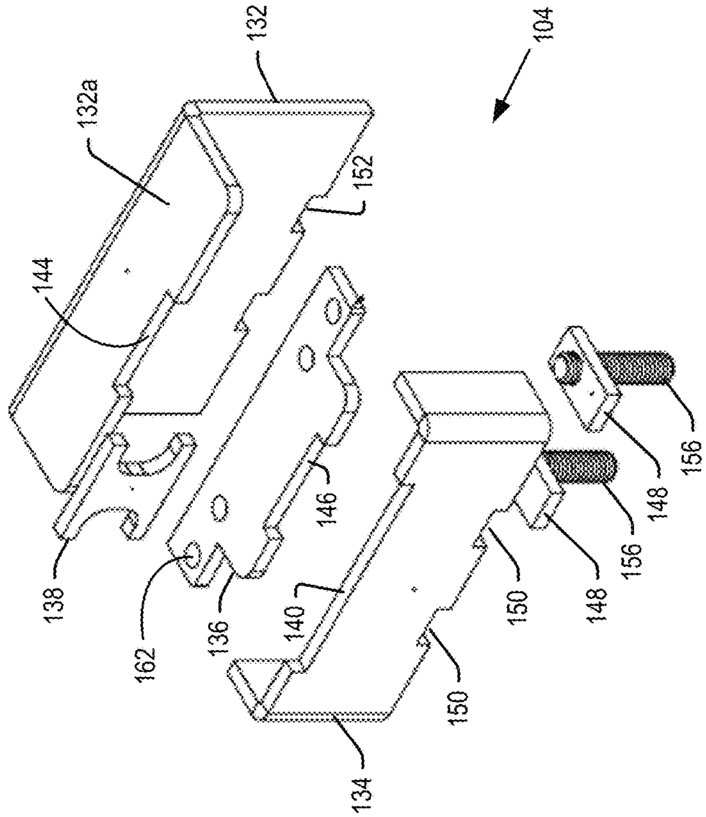
FIG. 9 is an exploded perspective view of a first abutment assembly according to an embodiment of the present technology.
Figure 8:
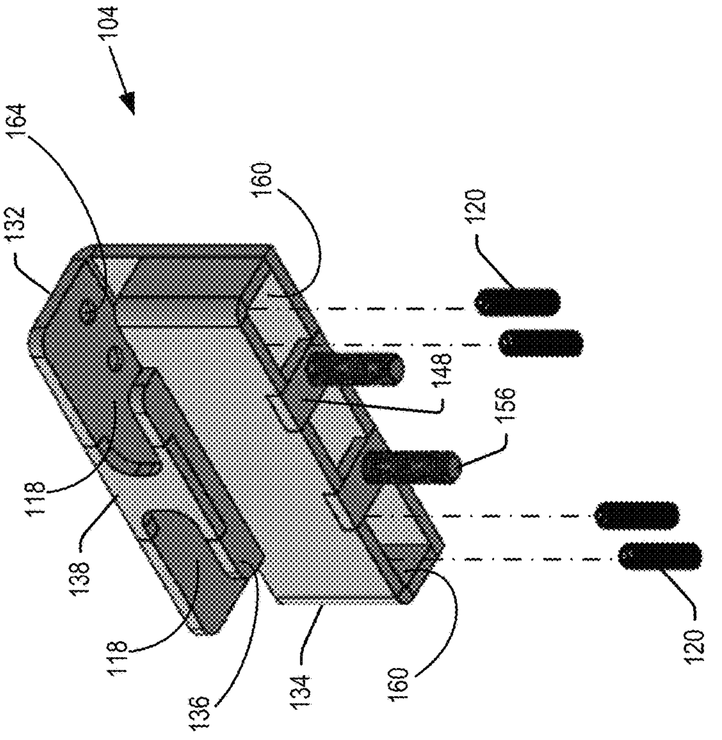
FIG. 8 is a perspective view of a first abutment assembly according to an embodiment of the present technology.

Referring now to FIGS. 1-6, as well as the perspective and exploded perspective views of FIGS. 8 and 9, the slats 102 may be mounted to restraint assemblies 104 to secure the slats 102 within security apparatus 100. FIGS. 8 and 9 show a single restraint assembly 104, but two restraint assemblies may be identical to each other (with the exception of the number of threaded rods 156 as explained below). Each restraint assembly 104 includes an outer plate 132, an inner plate 134, a mounting plate 136 and an inner cap 138. Each of these components may be formed of stainless steel, for example 16 gauge stainless steel, and may have a thickness of 0.125", though other materials, gauges and/or thicknesses are possible.

Each of the components 132, 134, 136 and 138 may be welded together as shown in FIGS. 8 and 9. In particular, the mounting plate 136 may have a front portion that may weld within a notch 140 formed in inner plate 134, and a rear portion that may weld to a face of the outer plate 132, so that the mounting plate mounts generally orthogonally to the inner plate 134. The inner cap 138 may have a top portion that welds within a notch 144 of a flange 132*a* of the outer plate 132, and a bottom portion that welds within a notch 146 of the mounting plate 136. The flange 132*a* is mounted generally parallel to the mounting plate 136. The inner and outer plates 134, 132 may be mounted generally parallel and spaced from each other, but the inner plate 134 may have ends that bend inward toward the outer plate 132, and weld to portions of the outer plate 132. The components 132, 134, 136 and 138 may be affixed to each other by methods other than welding in further embodiments.

The restraint assembly 104 shown in FIGS. 8 and 9 further includes a pair of screw plates 148 that may have first ends welded into notches 150 formed in a bottom portion of the inner plate 134, and second ends welded into notches 152 formed in a bottom portion of the outer plate 132. The screw plates 148 receive threaded rods 156 which may be welded into the holes in the screw plates 148, and which are used to affix the restraint assemblies 104 to the display table as explained below. The second restraint assembly 104 at the opposite ends of slats 102 may also have a pair of threaded rods 156 extending from a pair of screw plates 148 as in the restraint assembly 104 shown in FIGS. 8 and 9. However, in further embodiments, the second restraint assembly 104 may instead have a single threaded rod 156 extending from a single screw plate 148. Such an embodiment is shown in the end view of FIG. 5. The single threaded rod 156 shown in FIG. 5 may have a ⅜" diameter, and the pair of threaded rods shown in FIGS. 8 and 9 may have a ¼" diameter. These diameters are by way of example, and may vary in further embodiments. The diameters of the threaded rods 156 in respective restraint assemblies may have the same diameter, or the diameters of the pair of threaded rods 156 in the first restraint assembly may be larger than the single threaded rod 156 in the second restraint assembly.

In order to affix respective ends of the slats 102 to the restraint assemblies 104, the two slats 102 slide into channels 118 of a restraint assembly 104 from opposite directions until they abut the inner cap 138. Thus, the inner cap 138 defines the spacing 106 (FIG. 3) between the slats 102. Once positioned in the channels 118 against the inner cap 138, the slats 102 may be secured therein by set screws 120. As seen for example in FIG. 8, the set screws 120 may be inserted through openings 160 in a bottom portion of the restraint assemblies 104. The set screws 120 may then thread through holes 162 in the mounting plate 136, through the holes 122 in slats 102, and then into recesses 164 in the outer plate 132 to secure the slats 102 in place. Once the slats are affixed in the channels 118 and the restraint assemblies 104 are mounted to the display surface as explained below, the outer and inner plates 132, 134 form a secure enclosure preventing access to the set screws 120 so that the slats 102 cannot be removed. While two set screws 120 are shown affixing each end of each of the slats 102, there may be a single set screw or more than two set screws in further embodiments.

It is a feature of the present technology that slats 102 extends all of the way between the restraint assemblies 104. Some conventional security devices have rods that extend part way across a secured device, and which rods are secured at one end. Being secured at a single end, such rods may be bent away from the security device merely by exerting a moment force or torque on the rod sufficient to overcome the strength of the rod and/or the strength of its mounting point. The present technology overcomes this problem by having the slats extend entirely between the restraint assemblies on either side of the secured device. Thus, should any attempt be made to pull the slats apart, this force will be born by both restraint assemblies. The girders 110 further assist in dissipating any forces on the slats 102 attempting to pull the slats apart.

Figure 10:
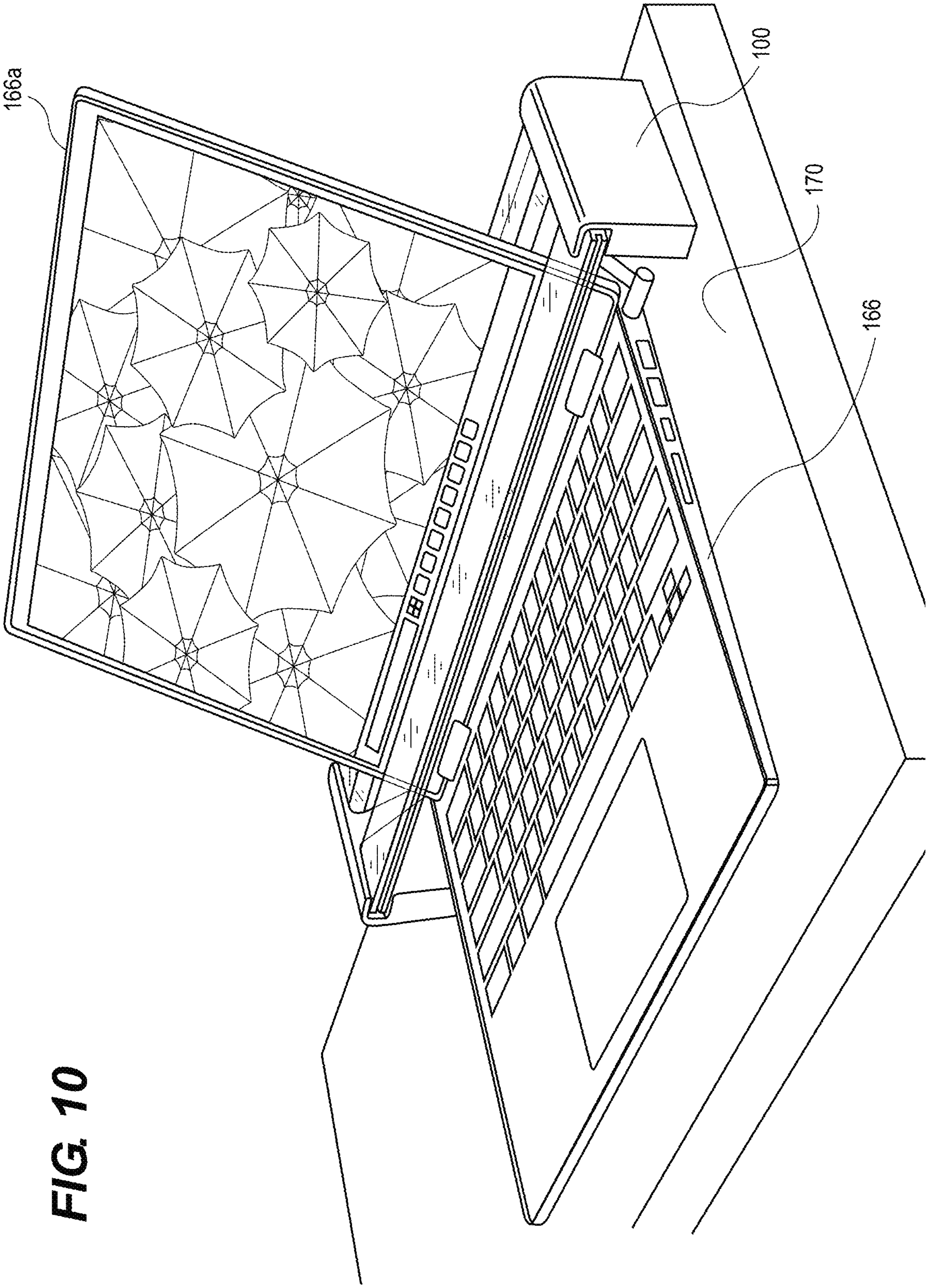
FIG. 10 is a perspective view of a security apparatus according to an embodiment of the present technology securing a laptop to a support surface.
Figure 11:
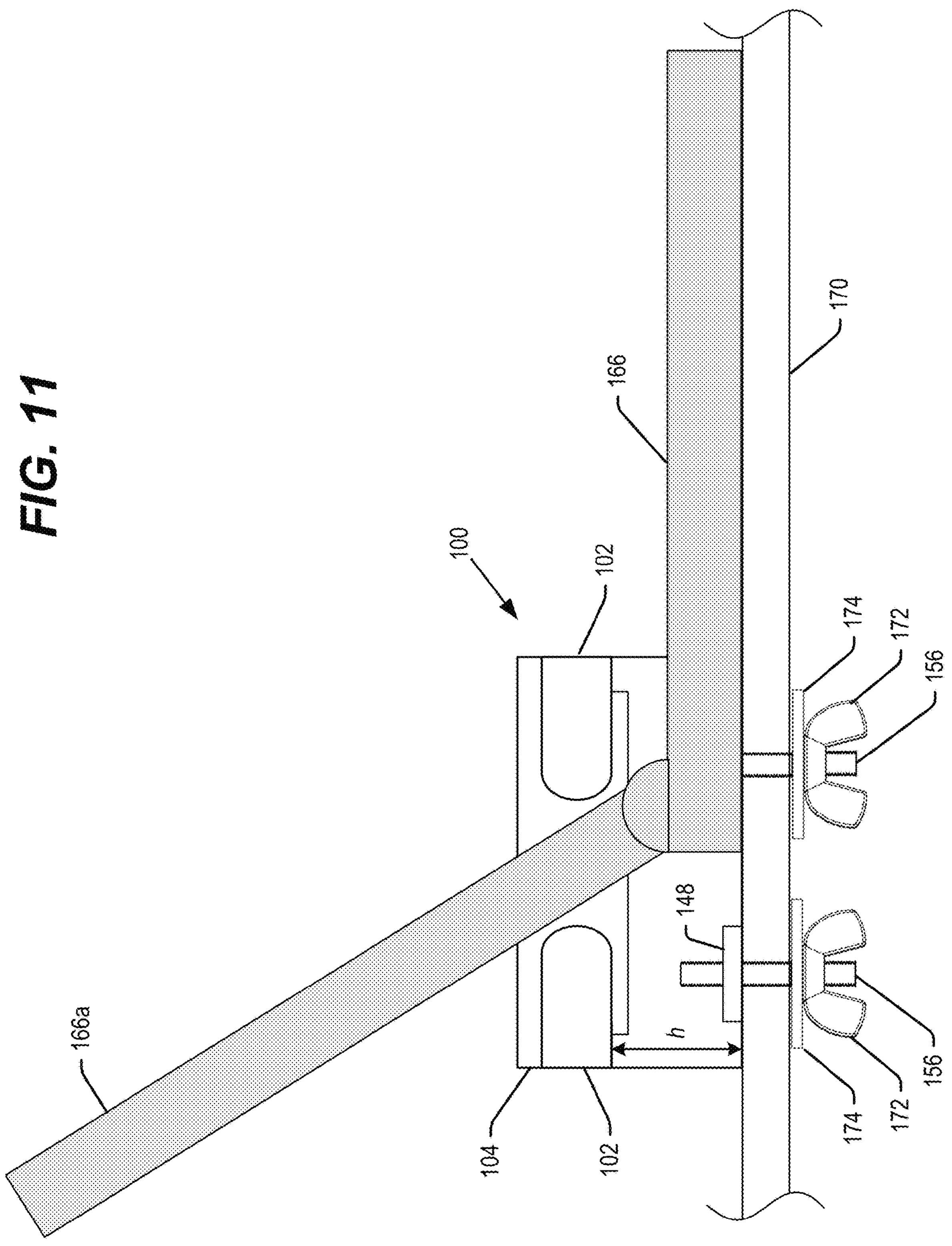
FIG. 11 is a cross-sectional end view of a security apparatus according to an embodiment of the present technology securing a laptop to a support surface.

FIG. 10 is a perspective view of a security apparatus 100 securing a laptop 166 to a display surface 170. FIG. 11 is a cross-sectional view of a security apparatus 100 securing a laptop 166 to a display surface 170. In order to secure laptop 166 with security apparatus 100, the apparatus is slid down over the display 166*a* of laptop 166 with the display 166*a* positioned between the slats 102. The security apparatus 100 is lowered over the display 166*a*, until lower surfaces of the two restraint assemblies 104 rest on the display surface 170. In this position, the threaded rods 156 extend through holes formed in the display surface 170 as seen in FIG. 11 (shown with the laptop 166 partially blocking one of the threaded rods 156). Once both restraint assemblies are seated on the display surface 170, wing nuts 172 (or other fasteners) may be affixed to the rods 156 to lock the security apparatus on the display surface 170. Each wing nut may have an attached washer 174, or otherwise have a base to distribute the load on wing nut 172 and the underside of the display surface 170 when the wingnut is tightened down over threaded rods 156.

The space on the underside of display surface 170 is preferably not publicly accessible. That is, the space beneath surface 170 may be a secure enclosure accessible only to authorized personnel who, for example, have a key to unlock the secure enclosure, and not accessible to the general public viewing the secured object. Such authorized personnel may access the space beneath display surface 170 to secure the security apparatus 100 to the surface 170 by affixing wing nuts 172 over rods 156. The authorized personnel may then lock the enclosure or space beneath the surface 170.

As noted above, embodiments of the present technology include one restraint assembly including a pair of threaded rods (FIG. 11) or only a single threaded rod (FIG. 5). Wing nuts 172 (or other fasteners) may be affixed over the pair of rods 156 as shown in FIG. 11, or over the single rod 156 shown in FIG. 5 to affix the restraint assembly to the display surface 170.

Using wing nuts as fasteners over rods 156 provides advantages in that the security apparatus 100 may be affixed to surface 170 and made operational without the need for any handheld tools. As such, the costs associated with such tools are eliminated, and there is no concern of needing to store tools or of losing and needing to replace such tools. Further, the security apparatus 100 disclosed herein is easy and intuitive to assemble, and thus, requires minimal instructions for assembly and use.

It is understood that the security apparatus 100 may be affixed to the surface 170 by fasteners other than rods 156. For example, instead of having threaded rods 156 welded to screw plates 148, the screw plates 148 may instead simply have threaded holes. In such embodiments, screws (including for example wing screws) may then be inserted through the display surface 170, from an underside of surface 170, into the threaded holes in the screw plates 148 to affix the security apparatus 100 to the surface 170. Other fasteners are contemplated for affixing the security apparatus to the surface 170, which fasteners are not accessible from the top of display surface 170.

The construction and appearance of security apparatus 100 are minimally invasive when a user is investigating/evaluating laptop 170, while at the same time preventing removal of the laptop 166 from display surface 170. The apparatus 100 provides these competing interests by providing a height, h, of the slats 102 so as to be spaced above the keyboard of laptop 166. This allows access to all the keys on the keyboard. As the slats 102 are transparent, the user can view the keys of the keyboard through the slats. The slats 102 are also spaced apart to allow the display to be tilted at different angles.

To prevent removal of the laptop 166, the spacing of the slats 102 are coordinated with the height, h, of the slats 102 above the surface 170 so that the laptop 166 cannot be removed. The spacing between slats may be increased by decreasing the height, h, and vice-versa. In one example, the spacing between the slats is 0.375" and the height of the slats above surface 170 may be 1.125". However, it is understood that the spacing and height may vary above and/or below these dimensions in further embodiments. Moreover, the spacing and/or height may be customized to specific lap top dimensions. Thus, where a display **166*a* is particularly thin, the slats 102 may be spaced closer together, or where a display 166*a* is particularly thick, the slats 102** may be spaced farther apart. The same is true for the height, h, for thick and thin keyboards.

The distance between opposing restraint assemblies 104 may vary, but in embodiments, it may be 14.75" for use with a first set of laptops, and it may be 16.75" for use with a second set of laptops that are larger than the first set of laptops. With these dimensions, there is room for power charging cords, USB and/or other attachments at the sides of the laptop adjacent the restraint assemblies 104. Other distances between opposing restraint assemblies are possible.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5%.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security apparatus configured to secure a secured object on a surface for displaying the secured object, the security apparatus comprising:

first and second slats each having first and second ends, the first and second slats spaced apart from each other and configured to engage an upwardly extending portion of the secured object; and first and second restraint assemblies each configured to mount to the surface on which the secured object is displayed with the first restraint assembly positioned on a first side of the secured object and the second restraint assembly positioned on a second side of the secured object opposed to the first side, the first end of the first slat affixed to the first restraint assembly, the second end of the first slat affixed to the second restraint assembly, the first end of the second slat affixed to the first restraint assembly, and the second end of the second slat affixed to the second restraint assembly.

2. The security apparatus of claim 1, wherein the first and second slats comprise slots, the security apparatus further comprising a girder positioned in each slot, the girders configured to strengthen the first and second slats.

3. The security apparatus of claim 1, wherein the first and second slats are transparent.

4. The security apparatus of claim 1, further comprising at least first and second threaded rods extending from bottom portions of the first and second restraint assemblies, the first and second threaded rods configured to affix the first and second restraint assemblies to the surface on which the secured object is displayed.

5. The security apparatus of claim 4, further comprising fasteners configured to be affixed to the threaded rods from an underside of the surface on which the secured object is displayed, the underside residing in a secured enclosure.

6. The security apparatus of claim 1, wherein the first and second restraint assemblies are configured to support one of the first and second slats above a horizontally extending portion of the secured object to enable use and inspection of the horizontally extending portion of the secured object.

7. The security apparatus of claim 1, wherein the first and second ends of the first and second slats are secured by screws to portions of the first and second restraint assemblies.

8. The security apparatus of claim 7, wherein the restraint assemblies comprise secure housings, the screws are positioned within the housing and accessible only from a portion of the restraint assemblies configured to mount to the surface on which the secured object is displayed.

9. The security apparatus of claim 1, wherein the secured object is a laptop.

10. The security apparatus of claim 1, wherein the first and second slats are configured to staddle the upwardly extending portion of the secured object to prevent removal of the secured object.

11. A security apparatus configured to secure a secured object on a display surface for displaying the secured object, the security apparatus comprising:

first and second slats spaced apart from each other and configured to receive an upwardly extending portion of the secured object in a space between the first and second slats; and first and second restraint assemblies each having a bottom surface configured to mount to the display surface for displaying the secured object with the first restraint assembly positioned on a first side of the secured object and the second restraint assembly positioned on a second side of the secured object opposed to the first side, each of the first and second restraint assemblies comprising:

screws affixing the first and second slats to the first and second restraint assemblies;

an inner plate, and an outer plate;

wherein the inner plate and the outer plate together define a pair of channels for receiving the pair of slats; and wherein the inner plate and outer plate together define an enclosure for preventing access to the screws affixing the first and second slats to the first and second restraint assemblies when said each restraint assembly is affixed to the display surface.

12. The security apparatus of claim 11, said each restraint assembly further comprising a mounting plate mounted between the inner plate and the outer plate, the mounting plate comprising screw holes for receiving the screws to affix first and second slats to the first and second restraint assemblies.

13. The security apparatus of claim 12, said each restraint assembly further comprising an inner cap mounted between the mounting plate and a flange of the outer plate.

14. The security apparatus of claim 13, wherein the inner cap defines the space between the first and second slats.

15. The security apparatus of claim 11, said each restraint assembly further comprising a screw plate mounted at the bottom surface, the screw plate configured to receive at least one threaded rod for affixing said each restraint assembly to the display surface.

16. The security apparatus of claim 15, wherein the threaded rod is welded to the screw plate.

17. The security apparatus of claim 15, wherein the threaded rod is screwed into a threaded hold of the screw plate.

18. The security apparatus of claim 11, each of the first and second slats comprising first and second ends, wherein the first end of the first slat affixed to the first restraint assembly, the second end of the first slat affixed to the second restraint assembly, the first end of the second slat affixed to the first restraint assembly, and the second end of the second slat affixed to the second restraint assembly.

19. A security apparatus configured to secure a laptop on a countertop on which the laptop is displayed, the security apparatus comprising:

first and second slats spaced apart from each other and configured to receive a display of the laptop in a space between the first and second slats; and first and second restraint assemblies each configured to mount to the countertop, the first and second slats mounted within channels in the first and second restraint assemblies, the first and second restraint assemblies configured to be secured to the countertop from an underside of the countertop accessible from a secured enclosure beneath the countertop.

20. The security apparatus of claim 19, wherein the first and second slats are configured with a spacing allowing tilting of the display to different angles while positioned between the first and second slats.

21. The security apparatus of claim 19, wherein the first and second restraint assemblies are configured to position the first and second slats above a keyboard of the laptop with a spacing between the first and second slats and the keyboard.

* * * * *